United States Patent [19]

Rouhotas, Sr.

[11] Patent Number: 4,493,272
[45] Date of Patent: Jan. 15, 1985

[54] AGRICULTURAL PLANTER WITH SLED FRAME, VACUUM DISPENSING AND GROUND DRIVE

[76] Inventor: Louie M. Rouhotas, Sr., 673 Sycamore Dr., Brawley, Calif. 92227

[21] Appl. No.: 165,671

[22] Filed: Jul. 3, 1980

Related U.S. Application Data

[63] Continuation of Ser. No. 931,185, Aug. 4, 1978, abandoned.

[51] Int. Cl.³ ............................ A01C 5/06; A01C 7/04; A01C 7/20
[52] U.S. Cl. .................................... 111/59; 111/69; 111/78; 111/81; 111/86; 221/211; 222/613; 222/614
[58] Field of Search .................... 111/34, 52, 59, 60, 111/62-65, 69, 70, 77, 78, 81, 85, 86; 221/211; 222/613-617, 620

[56] References Cited

U.S. PATENT DOCUMENTS

| | | | |
|---|---|---|---|
| 1,851,196 | 3/1932 | Lewis | 111/85 |
| 2,091,823 | 8/1937 | Large | 111/59 UX |
| 2,496,885 | 2/1950 | Milton | 111/85 |
| 2,539,592 | 1/1951 | Prince et al. | 111/85 X |
| 3,100,462 | 8/1963 | Steele et al. | 221/211 X |
| 3,126,748 | 3/1964 | Mostrong | 222/616 X |
| 3,202,323 | 8/1965 | Powell | 222/615 |
| 3,434,437 | 3/1969 | Mark et al. | 111/78 X |
| 3,701,327 | 10/1972 | Krumholz | 111/81 |
| 3,738,181 | 6/1973 | Gandrud | 222/613 X |
| 4,024,822 | 5/1977 | Ross et al. | 111/62 X |

FOREIGN PATENT DOCUMENTS 733897 10/1932 France ................................ 111/69

Primary Examiner—Steven A. Bratlie
Attorney, Agent, or Firm—Brown, Martin & Haller

[57] ABSTRACT

An agricultural planter for metering seeds for row crops includes a main frame in the form of a sled with transport wheels which can be selectively raised and lowered for transporting the planter and a tool bar for mounting a plurality of implements. A planter unit for the planter machine includes a main frame having a pair of vertically extending shanks for connecting to the tool bar, a mounting bracket for a seed shoe, and a bracket for a press wheel, a vacuum operated seed dispensing device with the vacuum provided by a vacuum fan mounted on the sled and powered by hydraulic motor with fluid from the main hydraulic system of the tractor. A jack shaft mounted transverse to the sled for powering the implements is driven by a ground wheel including a frame having a pair of reversible tool bar shanks and a drive transmission including a countershaft providing the pivotal support for the frame of the ground wheel.

11 Claims, 8 Drawing Figures

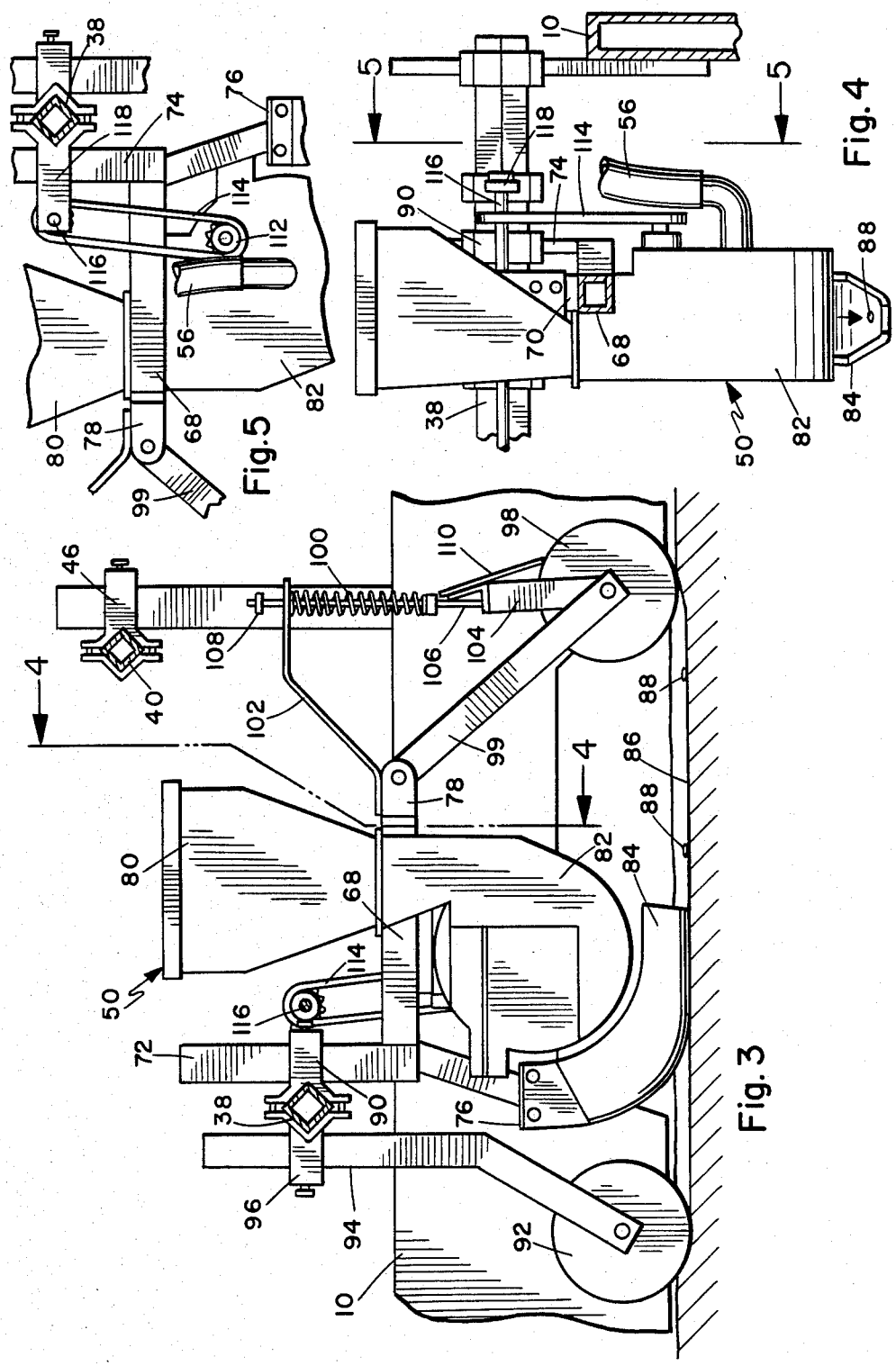

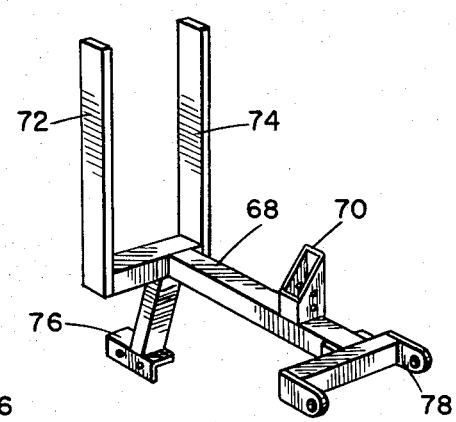
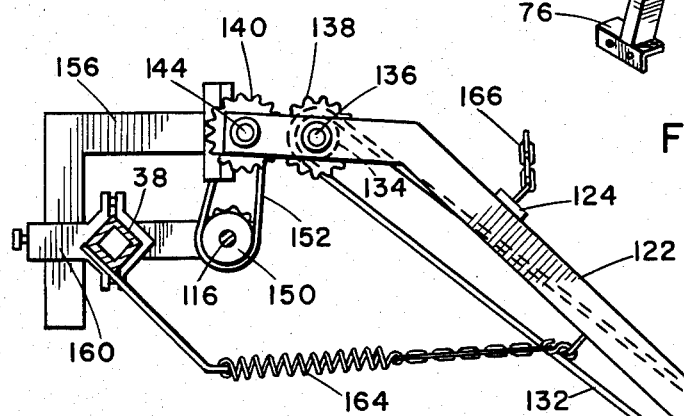
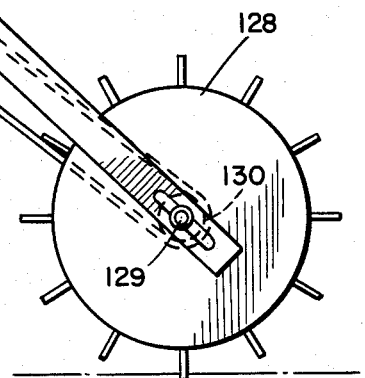
Fig. 6
Fig. 7
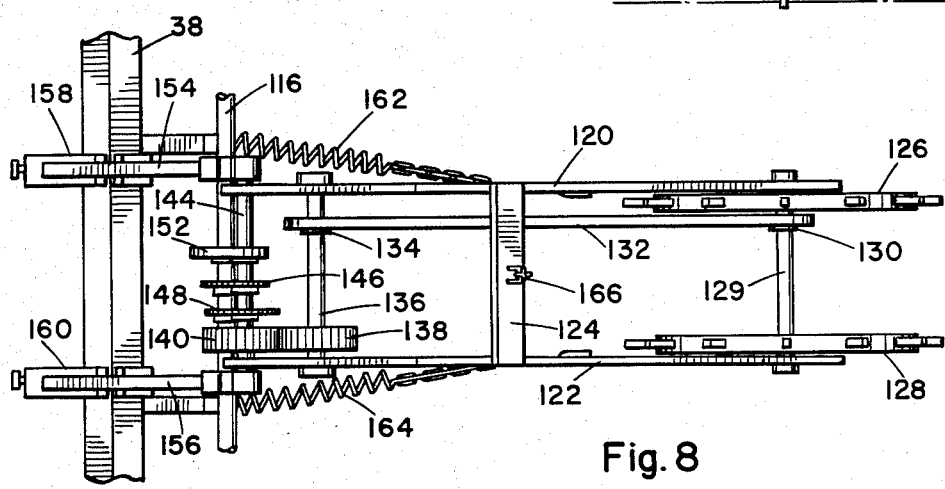
Fig. 8

AGRICULTURAL PLANTER WITH SLED FRAME, VACUUM DISPENSING AND GROUND DRIVE

This is a continuation of application Ser. No. 931,185 filed Aug. 4, 1978 now abandoned.

BACKGROUND OF THE INVENTION

The present invention relates to agricultural machines and pertains particularly to an improved implement for dispensing seeds, fertilizers and the like.

A great many agricultural products are grown and harvested as row crops. Seeds for row crop plants must be metered and dispensed at uniform distances along a prepared row in a field. Different crops require different spacing. Seed planters must be adaptable to plant the various size and shape of seeds for the various crops. Many planters use a dispensing plate having seed slots for moving selected seeds from a hopper to a discharge tube leading to a furrow defining the row. The dispensing plates must be driven accurately in order to position the seeds at the proper distance along the row.

The seeds usually must be graded and sized in order for the planter to function properly. The seeds must also be free of debri and foreign matter.

A recent improvement in the art of dispensing has eliminated many of the problems of the prior art, such as damage to seeds as a result of the mechanical seed plates. For example, a vacuum dispenser has been developed which picks up individual seeds from a hopper by means of a vacuum acting on the ports of a plate and the seeds are individually released at the proper position for movement down a chute to the planting position. This development has eliminated some of the requirements of grading of seeds and has reduced the damage to the seeds.

The improvement in the dispenser, however, has not been followed by corresponding improvements in the overall planting machines and the individual planting units. Most planting machines, for example, have become extremely complicated with multiple extremely complicated parts and mechanisms which are expensive to construct and maintain. The individual dispensing units, for example, have complicated frame work and support structure and are not easily and conveniently attachable and detachable from a main frame. Such units are also complicated and difficult and expensive to assemble, adjust and service.

Multiple unit planter apparatus typically employ one or more ground wheels for driving a jack shaft from which a plurality of planting or dispensing units are driven. The typical ground wheel units available today are difficult to mount and align on the planter frame.

Many other features of such machines are also open for improvement. Accordingly, it is desirable that new and improved planting machines be available which are simple and inexpensive to manufacture and simple and easy to assemble and maintain.

SUMMARY AND OBJECT OF THE INVENTION

Accordingly, it is the primary object of the present invention to overcome the above problems of the prior art.

Another object of the present invention is to provide an improved planting machine that is simple and inexpensive to construct, assemble, and maintain.

A further object of the present invention is to provide a planting machine having individual planting units which are quick and easy to attach and detach from the machine.

Another object of the present invention is to provide a new and improved ground drive for planting machines.

A still further object of the present invention is to provide a new and improved vacuum system for the vacuum dispensers of a planting machine.

In accordance with the primary aspect of the present invention a planting machine includes a plurality of vacuum dispensers with the vacuum blower mounted on the planter frame and driven by a hydraulic system of the towing tractor.

Another aspect of the present invention is an individual planting unit having a simple unitary frame for mounting a seed hopper on top thereof, a metering device and seed shoe below the frame, and having a pair of upwardly extending shanks for connecting to a tool bar, and a simple bracket for the pivotal connection of a press wheel thereto.

In accordance with a further aspect of the present invention, a ground drive assembly includes a ground wheel rotatably mounted on one end of a frame having first and second countershafts at the opposite ends of the frame and pivotally connected to a mounting frame having a pair of reversible shanks for releasably connecting to a tool bar.

BRIEF DESCRIPTION OF THE DRAWINGS

The above and other objects and advantages of the present invention will become apparent from the following description when read in conjunction with the drawing, wherein:

FIG. 3 is an enlarged sectional view taken on line 3—3 of FIG. 1.

FIG. 4 is a sectional view taken on line 4—4 of FIG. 3.

FIG. 5 is a sectional view taken on line 5—5 of FIG 4.

FIG. 6 is a perspective view of the mounting frame for the seed planter unit.

FIG. 7 is an enlarged sectional view taken on line 7—7 of FIG. 1.

FIG. 8 is a top plan view of the structure of FIG. 7.

DETAILED DESCRIPTION OF A PREFERRED EMBODIMENT

Figure 1:
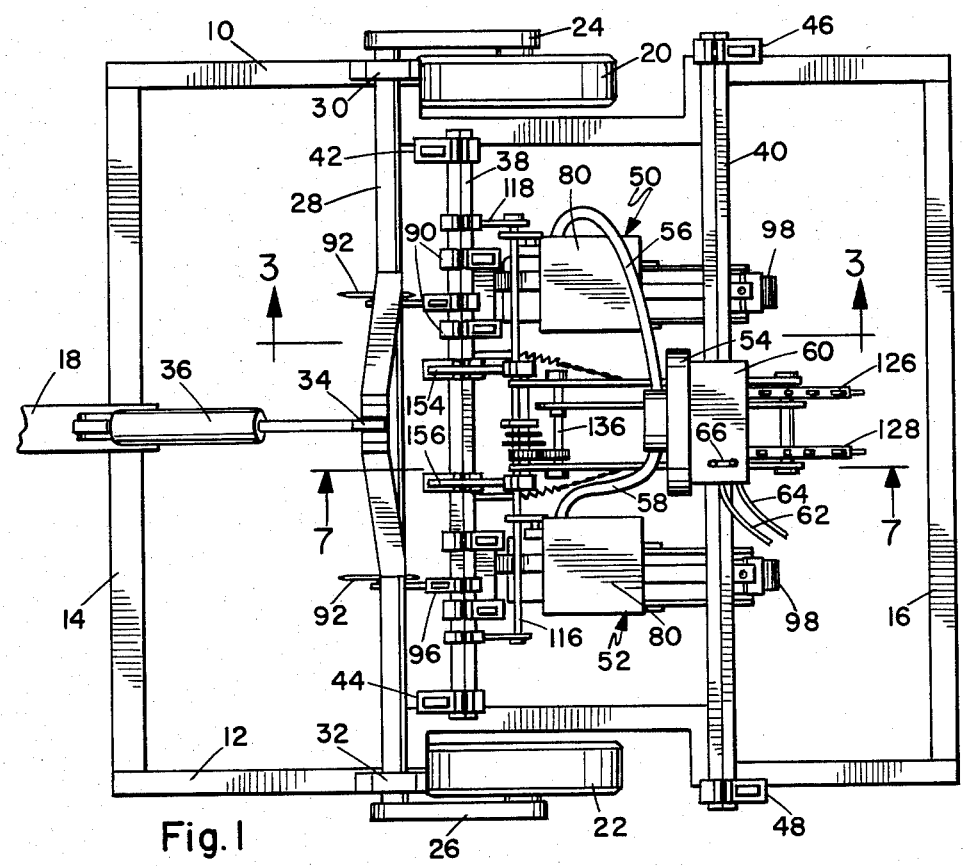
FIG. 1 is a top plan view of a typical implement frame incorporating two seed planter units according to the present invention.
Figure 2:
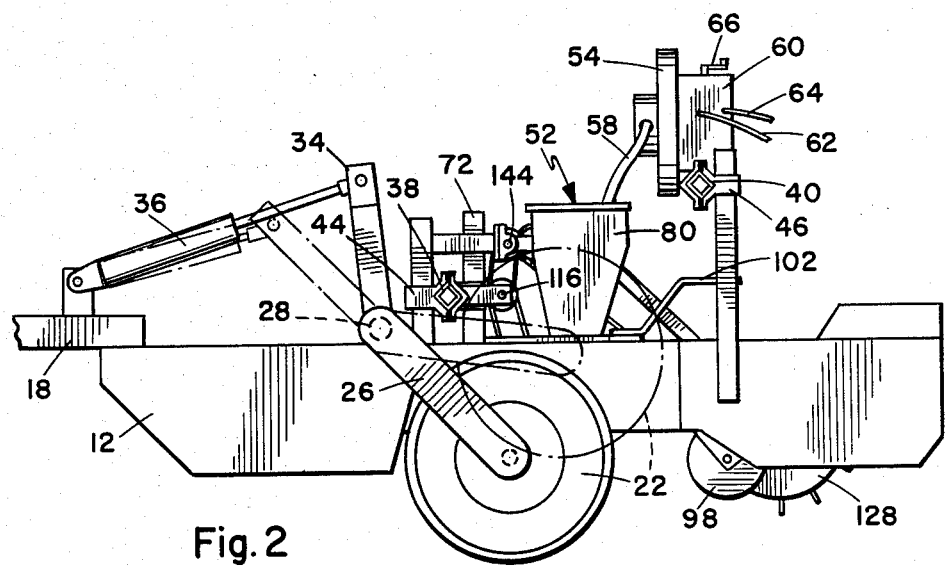
FIG. 2 is a side elevational view of the structure of FIG. 1.

Turning to FIGS. 1 and 2 of the drawing, a planting machine or apparatus in accordance with the present invention is illustrated and includes a frame comprising generally a pair of skids 10 and 12 connected together fore and aft by means of cross brace members 14 and 16. A tongue 18 at the forward end of the frame connects the apparatus in the usual manner to a towing tractor. The illustrated planter apparatus if the sled type and includes a pair of transport wheels 20 and 22 each rotatably mounted on a pair of arms 24 and 26, which are connected to a rotating shaft 28 which is journalled in bearings 30, 32 on the frame 10, 12. An upwardly extending arm 34 from the shaft 28 is connected to a hydraulic cylinder 36 which is powered in the usual manner from hydraulic system of the towing vehicle for raising and lowering the transport wheels 20 and 22 for raising and transporting the planter on the transport wheels.

A pair of tool bars 38 and 40 extend transverse of the frame and are connected at the ends thereof such as in clamps 42, 44, 46 and 48 to the skids or runners of the frame. These tool bars permit the selected mounting of selected number of implements, such as planter units and the like. Although a pair of planting units are disclosed in the illustrated embodiment, any number of planting units may be provided and any size frame unit may be utilized. The planting units of the present invention and the drive wheels and other components may also be utilized with other forms of frame units.

For example, three point hitch type frames may be utilized, wherein the frame is essentially a tool bar carried entirely by the three point hitch arrangement at the rear of the tractor. The present invention essentially provides improved modular units which may be utilized with any number of different styles of planting apparatus. In the illustrated embodiment, for example, a pair of planting units 50 and 52 are provided which are supported by the tool bar 38.

Each of the planter units 50 and 52 include vacuum metering devices, the vacuum of which is supplied by a vacuum fan 54 by way of a pair of vacuum lines 56 and 58. The vacuum blower unit 54 is mounted on the tool bar 40 on the main frame of the planting apparatus and is powered by means of a hydraulic motor 80 which is powered by the hydraulic system of the towing tractor by means of hydraulic lines 62 and 64 controlled by a control valve 66. This is an important aspect of the present invention in that it permits more precise control of the vacuum system and the power take-off drive of the prior art. In the prior art, the vacuum fan is typically mounted directly on the tractor or on the front of the implement frame with the fan driven by the power take-off of the tractor. Such an arrangement of the prior art is more difficult to connect and disconnect into and out of the power train of the system. With the present invention, a more remote mounting of the blower is permitted which permits the blower to be mounted directly adjacent to the many dispensing or metering devices and further provides for more precise control of the vacuum system. It can be more readily controlled, for example, independently of the rpm of the engine of the tractor.

Turning now to FIGS. 3 through 6 of the drawings, a dispenser or planter unit in accordance with the invention is illustrated. This planter unit comprises a main frame as best seen in FIG. 6, comprising essentially an elongated frame member 68 having a hopper bracket 70 intermediate the ends thereof and a pair of vertically upwardly extending shank members for engaging and clamping to a tool bar. A shoe bracket 76 extends forward and downwardly from the main frame member 68 for securing the seed shoe member into position. A clevis type pivot bracket 78 is fixed to the rear end of the central frame member 68 to which is pivotally connected a press wheel, as will be described.

Turning to FIG. 3, a hopper 80 for containing seed is secured to the hopper bracket 70 and is connected to a metering or dispensing device 82 preferably of the vacuum type. The details of the metering device are not herein disclosed, since they do not form in and of themselves a portion of this invention. These vacuum type metering mechanisms are available from Technohac Agricultural Machinery and Implements Ltd., Israel, and can be found in the United States on their planters identified as the Universal Pneumatic (Vacuum) Planter T.F. 500. These metering devices include a seed plate which rotates in a vertical plane with one face in contact with seed from the hopper and a vacuum drawn on the other face. Seeds are drawn to holes through the plate and are released when the hole is blocked on the vacuum side by a small roller or the like.

The metering device dispenses seeds which are dispensed into a shoe 84 which rides in a furrow 86 in a field for metering and dispensing a plurality of seeds 88 along the furrow. The spacing of the seeds is determined by the drive ratio between the dispensing apparatus and the ground drive wheel of the implement. A transmission transmits power from the ground drive wheel, which will be described later, and the rotating seed or dispensing plate in the dispenser unit. As illustrated in FIG. 3, the entire planter unit is quickly and easily attached and detached from the tool bar of the apparatus by means of clamps 90 which engage the upwardly extending shanks 72 and 74. These brackets also permit easy and quick vertical adjustment of the position of the planter unit with respect to the sled or other frame to which the unit is supported.

Mounted forward of the planter unit on the frame of the implement is a disc 92 rotatably journalled on an arm 94 which is connected by clamp 96 to the tool bar 26. This disc cuts and displaces clods of dirt ahead of the shoe 84, thus permitting the shoe to more readily form or ride in a furrow for receiving the seeds.

Trailing behind the planter unit is a press wheel 98 which is rotatably mounted between a pair of arms 99 which are pivotally secured to or mounted to the bracket 78. The press wheel 98 is forced downward into pressing engagement with the soil over and around the furrow by means of a compression spring 100 engaged by a bracket 102. The press wheel assembly includes a fork 104 and a pin or rod 106 extending upward through a bore in the bracket 102. A retaining nut or the like 108 on the end of rod 106 secures the rod in the bore of the bracket 102. The press wheel assembly may also include a scraper 110 for scraping the surface of the press wheel 98.

With the above essentially simple unitary frame and the planter assembly connected thereto, it is seen that a simple and uncomplicated planter unit is provided which may be quickly and easily clamped to and removed from a tool bar. The entire planter unit assembly is simple and inexpensive to construct and assemble.

The seed plate or disc in the dispensing apparatus 82 is driven or rotated by means of a chain and sprocket assembly including a sprocket 112 driven by means of a chain 114 from a jack shaft 116. The jack shaft 116 is an elongated shaft running transverse to the implement frame and mounted by means of a plurality of combination journal and tool clamps 118 to the tool bar 38. These clamps include an arm having a journal bearing for rotatably mounting a shaft. The jack shaft drive any number of different implements and is driven by means of one or more ground drive wheels, to be described.

Turning to FIGS. 7 and 8, a preferred construction of a ground wheel or ground drive wheel assembly is illustrated. This assembly includes a frame assembly comprising a pair of spaced apart frame members 120 and 122 connected together by a cross bar 124. A pair of ground wheels 126 and 128 are secured to a common shaft 129 journalled in the frame and include a sprocket 130 which drives a chain 132, which in turn drives a sprocket 134 on a shaft 136. The wheels each include a plurality of radial spikes or lugs which engage the ground surface for traction. A pinion gear 138 on the shaft 136 drives a pinion 140 on a second countershaft 144 having a plurality of sprockets 146 and 148 thereon. These sprockets are selectively connected to a corresponding series of sprockets 150 on the jack shaft 116, and a chain 152 connects the respective sprockets on the countershaft and the jack shaft to obtain the desired seed spacing.

The frame 120, 122 is pivotally mounted for pivotal movement about shaft 144. The shaft 144 is also journalled in a pair of L-shaped brackets 154 and 156 each of which includes a shank portion which extends into a pair of brackets 158 and 160. These brackets 158 and 160 support the ground drive wheel assembly from the tool bar 38. Thus, any number of the drive wheels may be utilized in a particular implement frame. The arrangement is such that the L-shaped brackets 154 and 156 may be reversed and extend vertically upward instead of vertically downward, as shown in FIG. 7. With this versatile arrangement the ground drive assembly may be positioned at various positions along or within an implement frame. For example, with the arrangement as shown, the L-shaped brackets extend over and extend downward into the brackets on the tool bar. With this overhead type of arrangement, the drive wheel can be positioned and extend over a transport wheel which may be positioned either inboard or outboard of the frame assembly. In addition, the arrangement permits the drive wheels to straddle a skid of a sled type frame arrangement. A pair of tension springs 162 and 164 pull the ground wheel downward into engagement with the ground. A limiting device comprising a chain assembly or the like 166 is connected at one end to the cross bar 124 and at the other end to a clamp on tool bar 40. This arrangement prevents the ground wheel from extending downward and maintaining ground engagement when the implement frame is raised for transport.

From the above description and drawings, it is seen that I have provided an improved planting and distributing implement having simple and inexpensive components which are quickly, easily and inexpensively assembled into a multiple planter unit having any selected number of planter units. My invention includes improved individual planter units, improved vacuum system, and improved ground drive assembly, among other improvements.

While I have illustrated and described my invention by means of specific embodiments, it is to be understood that numerous changes and modifications may be made therein without departing from the spirit and scope of the invention as defined in the appended claims.

Having described my invention, I now claim:

1. An agricultural seed planting implement comprising in combination:
   a frame, said frame including connecting means for connecting said frame to a tractor for movement therewith and a first tool bar extending transverse to the axis of movement of the frame,
   an elongated jack shaft rotatably mounted on said frame and extending parallel to the tool bar,
   ground drive means for driving the jack shaft proportional to the rate of movement of the implement over the ground,
   seed distributor means detachably mounted on said tool bar including a vacuum metering device driven by said jack shaft for distributing seeds at selected spacings,
   a vacuum fan in a position remote from said connecting means mounted on said frame for controlling the vacuum in said metering device,
   and
   hydraulic motor means mounted on said frame and driven by the hydraulic system of the tractor driving said vacuum fan wherein said distributor means includes a generally horizontally extending elongated frame having a forward end and a rearward end, and a pair of shanks fixed to and extending upward at a fixed angle from the forward end of said elongated frame for releasably and vertically adjustably connecting to said tool bar for supporting said elongated frame on said tool bar for movement as a unit therewith,
   a seed hopper mounted on the top of said elongated frame,
   said vacuum metering device mounted on and beneath the elongated frame for receiving seeds from said hopper, and
   a seed planting shoe mounted on and extending beneath and forward of said elongated frame, and said distributor means moveable as a unit with said first tool bar.

2. The planting implement of claim 1, including a press wheel pivotally connected to said elongated frame at the rearward end for following said planting shoe and including means biasing said press wheel into engagement with the ground.

3. The planting implement of claim 2 wherein said ground drive means for driving said jack shaft comprises:
   a first frame means including a pair of spaced apart L-shaped members including a pair of vertical shanks for detachably clamping to said tool bar,
   second frame means pivotally connected at one end to said first frame means by pivot means including first counter shaft,
   and drive means drivingly connecting said first counter shaft to said jack shaft,
   a ground engaging drive wheel rotatably mounted on the other end to said second frame means, and
   chain means drivingly connecting said drive wheel to said counter shaft.

4. The planting implement of claim 1, wherein said jack shaft is detachably mounted on said tool bar.

5. The planting apparatus of claim 1, wherein said frame comprises a sled having a pair of runners extending parallel to the axis of movement of said frame.

6. The planting apparatus of claim 5, including a second tool bar extending parallel to and aft of said first tool bar, and
   said vacuum fan is mounted on said second tool bar.

7. The planting implement of claim 1 wherein said ground drive means for driving said jack shaft comprises:
   first frame means comprising a pair of L-shaped members including a pair of vertically extending shanks for detachably clamping to said tool bar,
   second frame means pivotally connected at one end to said first frame means by pivot means including a first counter shaft,
   and drive means drivingly connecting said first counter shaft to said jack shaft,
   a ground engaging drive wheel rotatably mounted on the other end of said second frame means, and
   chain means drivingly connecting said drive wheel to said first counter shaft.

8. The planting apparatus of claim 7, including a second countershaft rotatably mounted adjacent said first countershaft, first and second pinion gears on said first and second shafts and in driving engagement, and said chain means drivingly connect said drive wheel directly to said second countershaft.

9. The planting apparatus of claim 8 including a plurality of sprockets on said jack shaft, a plurality of corresponding sprockets on said first counter shaft, and a chain for selectively drivingly connecting a sprocket on said jack shaft, to a corresponding sprocket on said first counter shaft for establishing a selected seed spacing.

10. The planting implement of claim 7 wherein said vertically extending shanks are vertically adjustable on said tool bar.

11. The planting implement of claim 1 wherein said tool bar includes bracket means and said shanks are vertically adjustable in said bracket means.

* * * * *